US012510552B2

(12) United States Patent
Takahashi

(10) Patent No.: US 12,510,552 B2
(45) Date of Patent: Dec. 30, 2025

(54) AUTOMATIC ANALYZER

(71) Applicant: Hitachi High-Tech Corporation, Tokyo (JP)

(72) Inventor: Takuya Takahashi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 869 days.

(21) Appl. No.: 17/640,851

(22) PCT Filed: Sep. 18, 2020

(86) PCT No.: PCT/JP2020/035543
§ 371 (c)(1),
(2) Date: Mar. 7, 2022

(87) PCT Pub. No.: WO2021/054456
PCT Pub. Date: Mar. 25, 2021

(65) Prior Publication Data
US 2022/0341958 A1 Oct. 27, 2022

(30) Foreign Application Priority Data
Sep. 20, 2019 (JP) ................. 2019-171369

(51) Int. Cl.
*G01N 35/10* (2006.01)
*B05B 15/55* (2018.01)
*B08B 9/08* (2006.01)

(52) U.S. Cl.
CPC ............. *G01N 35/10* (2013.01); *B05B 15/55* (2018.02); *B08B 9/08* (2013.01)

(58) Field of Classification Search
CPC ............... G01N 35/10; G01N 35/1011; G01N 35/1065; G01N 35/109; G01N 35/1004; B05B 15/55; B05B 15/555; B08B 9/08
See application file for complete search history.

(56) References Cited

U.S. PATENT DOCUMENTS

2004/0245275 A1* 12/2004 Yanami ................. B01F 31/44
221/197
2005/0074363 A1* 4/2005 Dunfee .............. G01N 35/1079
422/81
(Continued)

FOREIGN PATENT DOCUMENTS

EP      2354797 A1     8/2011
JP      02-296131 A    12/1990
(Continued)

OTHER PUBLICATIONS

Extended European Search Report received in corresponding European Application No. 20864733.9 dated Aug. 11, 2023.
(Continued)

*Primary Examiner* — Benjamin R Whatley
*Assistant Examiner* — Curtis A Thompson
(74) *Attorney, Agent, or Firm* — MATTINGLY & MALUR, PC

(57) ABSTRACT

An automatic analyzer dispenses each specimen and reagent in a reaction vessel so as to make the specimen and the reagent react with each other and measures a liquid obtained by the reaction. The automatic analyzer includes a plurality of dispensing mechanisms; a controller which controls the plurality of dispensing mechanisms; a normal cleaning tank dedicated to each of the dispensing mechanisms, which is provided at a position where only one of the plurality of dispensing mechanisms accesses, and performs normal cleaning with respect to the dispensing mechanism that has accessed; and a special cleaning tank shared by each of the dispensing mechanisms, which is provided at a position where all of the plurality of dispensing mechanisms access, and performs cleaning different from the normal cleaning with respect to the dispensing mechanism that has accessed.

9 Claims, 16 Drawing Sheets

(56) References Cited

U.S. PATENT DOCUMENTS

| | | | | |
|---|---|---|---|---|
| 2011/0236990 A1* | 9/2011 | Mizutani | ............ | G01N 33/5304 |
| | | | | 422/62 |
| 2014/0363896 A1* | 12/2014 | Suzuki | ............... | G01N 35/1004 |
| | | | | 436/175 |
| 2015/0010436 A1* | 1/2015 | Okusa | ................ | G01N 35/0092 |
| | | | | 422/67 |
| 2016/0069922 A1* | 3/2016 | Horiuchi | ................ | G01N 21/15 |
| | | | | 250/431 |
| 2016/0290991 A1* | 10/2016 | Okamura | .................. | B01L 3/52 |
| 2017/0153263 A1* | 6/2017 | Mizuki | .................... | B08B 9/035 |
| 2020/0378996 A1* | 12/2020 | Kojima | ............. | G01N 35/1011 |

FOREIGN PATENT DOCUMENTS

| | | |
|---|---|---|
| JP | 2009-300151 A | 12/2009 |
| JP | 2015-161559 A | 9/2015 |
| JP | 2016-211879 A | 12/2016 |
| JP | 6067584 B2 | 1/2017 |
| JP | 2017-96761 A | 6/2017 |
| JP | 2017-110913 A | 6/2017 |

OTHER PUBLICATIONS

International Search Report of PCT/JP2020/035543 dated Dec. 15, 2020.

Chinese Office Action received in corresponding Chinese Application No. 202080064302.9 dated Jun. 25, 2025.

* cited by examiner

FIG. 6

| SPECIMEN DISPENSING MECHANISM 13 | SPECIMEN DISPENSING MECHANISM 14 |
|---|---|
| DISPENSING OPERATION | DISPENSING OPERATION |
| DISPENSING OPERATION | SPECIAL OPERATION |
| SPECIAL OPERATION | DISPENSING OPERATION |
| SPECIAL OPERATION | SPECIAL OPERATION |

AUTOMATIC ANALYZER

BACKGROUND OF THE INVENTION

1. Field of the Invention

The present invention relates to an automatic analyzer.

2. Description of the Related Art

In an automatic analyzer, in order to prevent an aspiration or discharge amount from fluctuating and contamination from occurring, a dispensing nozzle that dispenses a specimen or a reagent is generally cleaned by a cleaning mechanism to be repeatedly used. However, micro-quantity of the specimen or the like and high sensitivity of analysis have advanced year by year, and thus if the dispensing nozzle is insufficiently cleaned, an influence on an analysis accuracy increases, and it is required more than ever to improve a cleaning performance of the dispensing nozzle.

Therefore, as a technique for improving the cleaning performance of the dispensing nozzle, it is known that a cleaning solution containing a detergent is used to perform special cleaning stronger than special cleaning performed by cleaning water. For example, JP-A-2017-110913 discloses that "special cleaning is configured with cleaning performed in a first cleaning tank 28b with a cleaning solution containing an alkaline, acidic, or neutral detergent or the like supplied to the first cleaning tank 28b, and (normal) cleaning performed in a first cleaning tank 28a with cleaning water performed after the above cleaning" (paragraph 0043).

However, the automatic analyzer in the related art disclosed in JP-A-2017-110913 or the like includes special cleaning tanks dedicated to a plurality of dispensing mechanisms respectively, and thus a size of the entire analyzer is enlarged and a manufacturing cost is increased.

SUMMARY OF THE INVENTION

An object of the invention is to provide an automatic analyzer capable of performing special cleaning while preventing an increase in a size of the entire analyzer and suppressing a manufacturing cost.

In order to solve the above problems, the invention provides an automatic analyzer that dispenses a specimen and a reagent individually into a reaction vessel to make the specimen and the reagent react with each other and measures a liquid obtained by the reaction. The automatic analyzer includes: a plurality of dispensing mechanisms; a controller which controls the plurality of dispensing mechanisms; a normal cleaning tank dedicated to each of the dispensing mechanisms, which is provided at a position where only one of the plurality of dispensing mechanisms accesses, and performs normal cleaning with respect to the dispensing mechanism that has accessed; and a special cleaning tank shared by each of the dispensing mechanisms, which is provided at a position where all of the plurality of dispensing mechanisms access, and performs cleaning different from the normal cleaning with respect to the dispensing mechanism that has accessed.

The invention can provide the automatic analyzer capable of performing the special cleaning while preventing the increase in the size of the entire analyzer and suppressing the manufacturing cost.

BRIEF DESCRIPTION OF THE DRAWINGS

FIG. 6 is a diagram illustrating a combination of operation patterns in each specimen dispensing mechanism.

DESCRIPTION OF THE PREFERRED EMBODIMENTS

Hereinafter, embodiments of an automatic analyzer of the invention will be described with reference to the drawings.

Example 1

Figure 1:
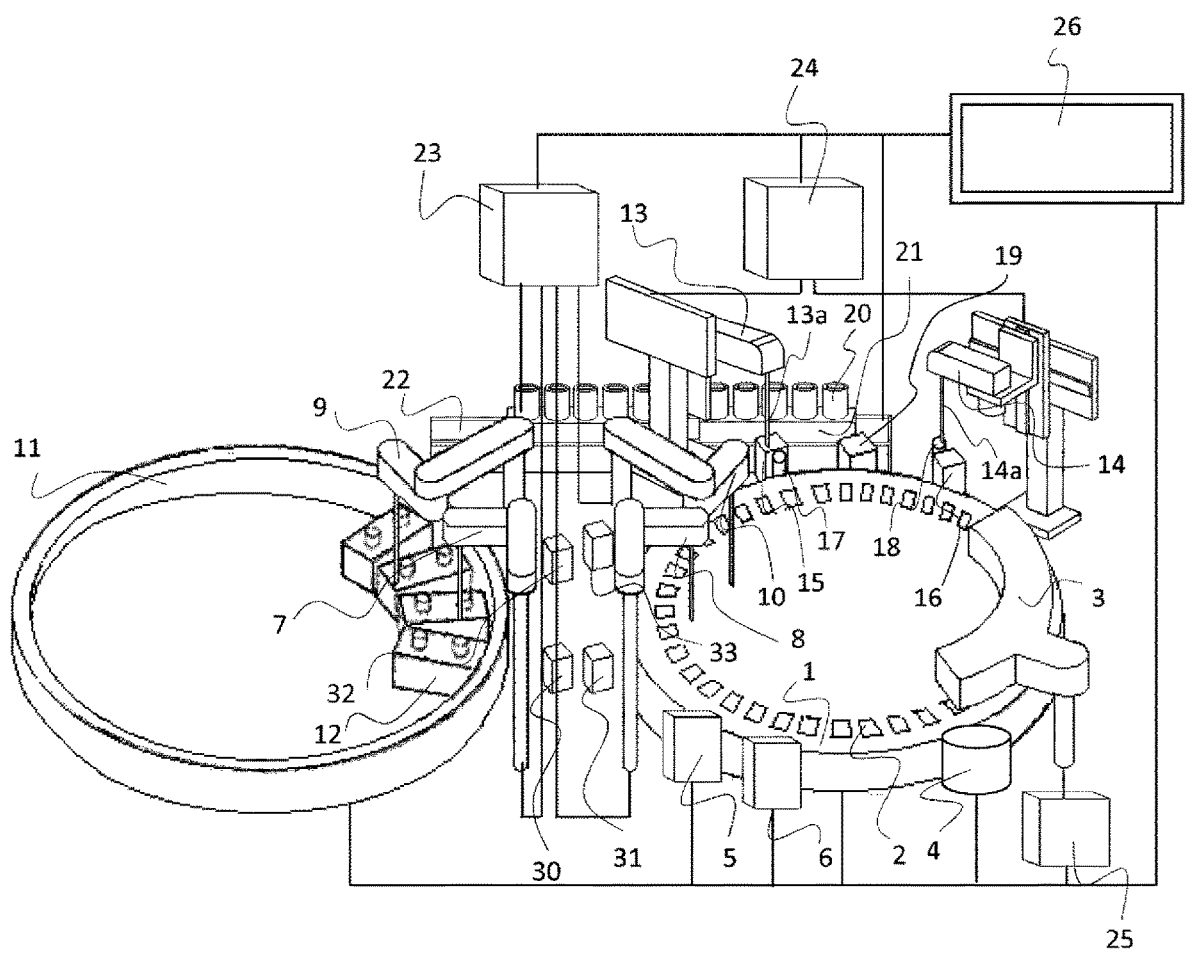
FIG. 1 is a configuration diagram schematically illustrating an analysis unit in an automatic analyzer according to Example 1.

FIG. 1 is a configuration diagram schematically illustrating an analysis unit in an automatic analyzer according to the present example. As illustrated in FIG. 1, reaction vessels 2 are disposed in a circumferential shape on a reaction disk 1, and a plurality of reagent bottles 12 are arranged in the circumferential shape in a reagent disk 11. Reagent dispensing mechanisms 7 to 10 are connected to a reagent pump 23 via a syringe. Specimen containers 20 containing a test specimen such as blood or urine can be moved between the reaction disk 1 and the reagent disk 11 by a specimen transport mechanism 22 while the specimen containers 20 are placed on a rack 21.

A cleaning mechanism 3, a spectrophotometer 4, stirring mechanisms 5 and 6, a reagent disk 11, and a specimen pump 24 are disposed around the reaction disk 1, and a cleaning pump 25 is connected to the cleaning mechanism 3 for cleaning the used reaction vessel 2. Specimen dispensing mechanisms 13 and 14 are disposed between the reaction disk 1 and the specimen transport mechanism 22, and are connected to the specimen pump 24 via the syringe.

The automatic analyzer according to the present example includes cleaning tanks 30 to 33 disposed in operation trajectories of the reagent dispensing mechanisms 7 to 10, a normal cleaning tank 15 and a drying mechanism 17 disposed in an operation trajectory of the specimen dispensing mechanism 13, a normal cleaning tank 16 and a drying mechanism 18 disposed in an operation trajectory of the specimen dispensing mechanism 14, and a special cleaning tank 19 disposed in the operation trajectories of the specimen dispensing mechanism 13 and 14. The special cleaning tank or the drying mechanisms may be disposed in the operation trajectories of the reagent dispensing mechanisms 7 to 10.

Here, the specimen dispensing mechanisms 13 and 14 respectively include dispensing nozzles 13a and 14a. The dispensing nozzles 13a and 14a move horizontally (rotate about a rotation axis in a vertical direction and move in parallel on a rail in a horizontal direction) and move vertically, and dispense the specimen from the specimen container 20 into the reaction vessel 2.

The dispensing nozzles 13a and 14a are normally cleaned in the normal cleaning tanks 15 and 16 dedicated to the specimen dispensing nozzles 13a and 14a respectively. However, when measuring a test item specified in advance, the specimen dispensing nozzles 13a and 14a are subjected to special cleaning different from normal cleaning in the special cleaning tank 19 shared by the specimen dispensing nozzles 13a and 14a, and then are normally cleaned in the normal cleaning tanks 15 and 16 dedicated to the dispensing nozzles 13a and 14a respectively, and water droplets adhering to surroundings are removed by the drying mechanisms 17 and 18 dedicated to the specimen dispensing nozzles 13a and 14a respectively.

The automatic analyzer according to the present example includes a controller 26 having a function as an analysis unit configured to analyze the test specimen in the reaction vessel 2, and an operation of each mechanism connected to the controller 26 is controlled.

Figure 2:
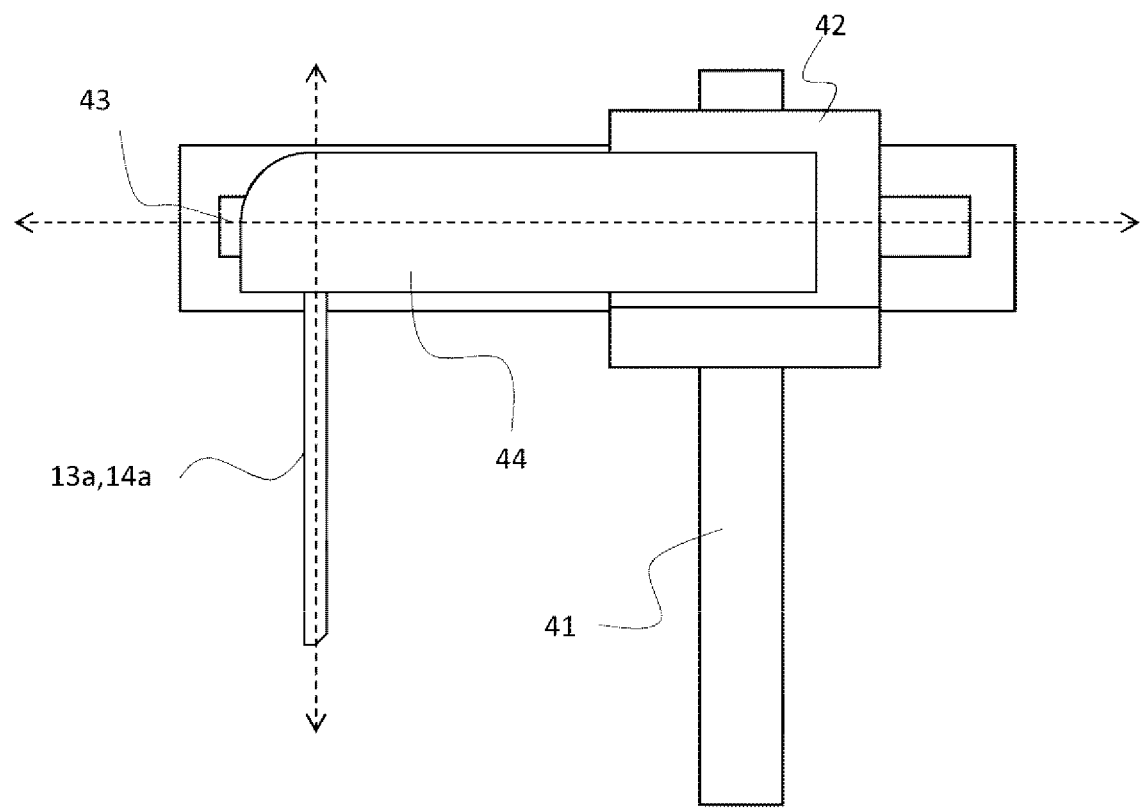
FIG. 2 is a side view of a specimen dispensing mechanism in Example 1.

Next, a schematic configuration of the specimen dispensing mechanism 13 or 14 will be described with reference to FIG. 2. FIG. 2 is a side view of the specimen dispensing mechanism 13 or 14 in the present example. As illustrated in FIG. 2, the specimen dispensing mechanisms 13 and 14 respectively include the specimen dispensing nozzles 13a and 14a connected to the syringe to aspire and discharge the specimen, and each include an arm 44 for holding the sample dispensing nozzle 13a or 14a, a vertical mechanism 41 that moves the arm 44 vertically, a rotating mechanism 42 that rotates the arm 44, and a horizontal mechanism 43 that moves the arm 44 horizontally. The rotating mechanism 42 may be a horizontal mechanism that moves in a direction orthogonal to the horizontal mechanism 43.

Figure 3:
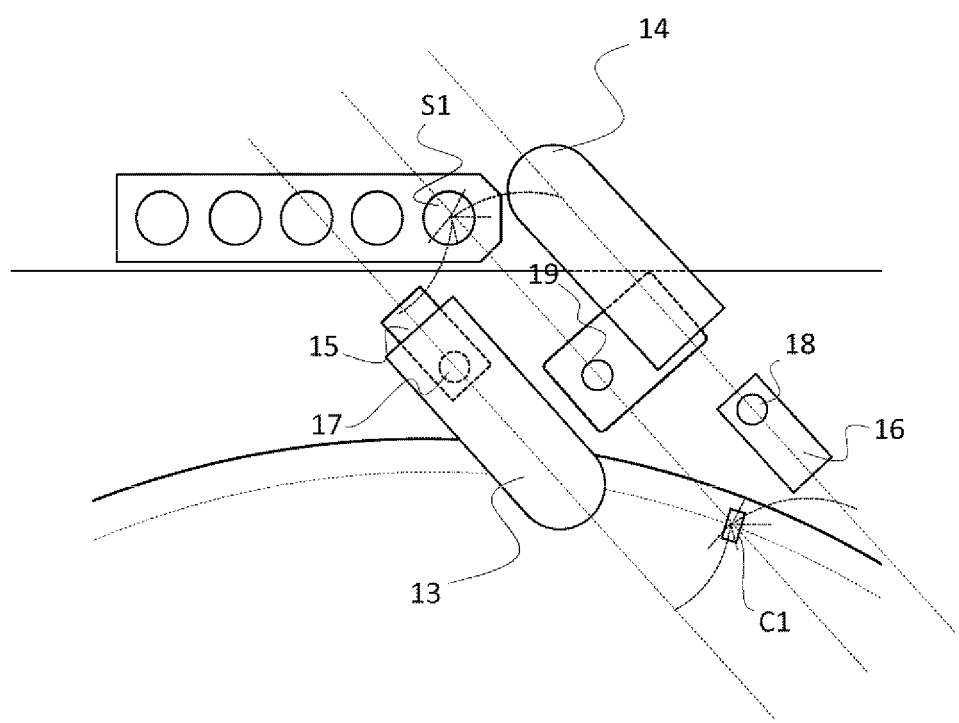
FIG. 3 is a plan view illustrating a positional relationship of specimen dispensing mechanisms in Example 1.

FIG. 3 is a plan view illustrating a positional relationship of the specimen dispensing mechanisms 13 and 14 in the present example. As illustrated in FIG. 3, the present example is an automatic analyzer in which the drying mechanisms 17 and 18 dedicated to the specimen dispensing mechanisms 13 and 14 are each disposed at a position where only one of the two specimen dispensing mechanisms 13 and 14 accesses. Since the automatic analyzer according to the present example requires only one special cleaning tank, an entire analyzer can be miniaturized and a manufacturing cost can be reduced.

A specimen aspiration position S1 and a specimen discharge position C1 are respectively disposed at ends of the operation trajectories of the specimen dispensing mechanisms 13 and 14. The normal cleaning tanks 15 and 16 and the drying mechanisms 17 and 18 dedicated to the specimen dispensing mechanisms 13 and 14, and the special cleaning tank 19 shared by the specimen dispensing mechanisms 13 and 14 are disposed between the specimen aspiration position S1 and the specimen discharge position C1.

Here, the special cleaning performed in the special cleaning tank 19 uses a detergent solution containing a detergent to perform a stronger cleaning than the normal cleaning, and is carried out when the special cleaning is set as a required item in the test item set for the specimen. A method using a detergent will be described as a specific cleaning method for the special cleaning, but the method is not limited thereto, and a method using ultrasonic waves may be used.

The drying mechanisms 17 and 18 in the present example are disposed inside the normal cleaning tanks 15 and 16 or at positions close to the normal cleaning tanks 15 and 16. Each of the configurations of the drying mechanisms 17 and 18 adopts an air-injection blower that blows compressed air to the specimen dispensing nozzle 13a and blows off a cleaning solution with wind. The drying mechanism 17 may be a dry port using vacuum aspiration or a wiper for wiping off the cleaning solution. By providing the drying mechanisms 17 and 18 in this way, the cleaning solution adhering to the specimen dispensing nozzle 13a after the special cleaning can be prevented from being carried into the specimen, and high analysis accuracy can be maintained.

Next, a flow of a specimen dispensing operation will be described with reference to FIG. 4. Here, a dispensing operation of the specimen dispensing mechanism 13 of the two specimen dispensing mechanisms 13 and 14 will be described as an example.

First, the specimen dispensing mechanism 13 moves from the normal cleaning tank 15 to the specimen aspiration position S1 on the specimen container 20 (step S100).

At this specimen aspiration position S1, the specimen dispensing nozzle 13a descends, and the specimen dispensing nozzle 13a is immersed in the specimen contained in the specimen container 20. In this state, the syringe operates to aspirate the specimen, and then the specimen dispensing nozzle 13a ascends (step S101).

Then, the specimen dispensing mechanism 13 moves from the specimen aspiration position S1 to the normal cleaning tank 15 (step S102). At a position of the normal cleaning tank 15, an outer wall of the specimen dispensing nozzle 13a is cleaned by water (step S103).

Then, the specimen dispensing mechanism 13 moves to the specimen discharge position C1 on a predetermined reaction vessel 2 on the reaction disk 1 (step S104).

The specimen dispensing nozzle 13a descends, the syringe operates to discharge the specimen, and when the discharge of the specimen is ended, the specimen dispensing nozzle 13a ascends (step S105).

Then, the specimen dispensing mechanism 13 moves to the normal cleaning tank 15 (step S106).

Here, when the same specimen is continuously dispensed, one cycle ends according to the flow. However, when a last dispensing of the same specimen is performed, the normal cleaning is further performed by the operation of the syringe. Specifically, by discharging the water in a tank (not shown) from the specimen dispensing nozzle 13a, not only the outer wall but also an inner wall of the specimen dispensing nozzle 13a is cleaned (internal cleaning).

Figure 5:
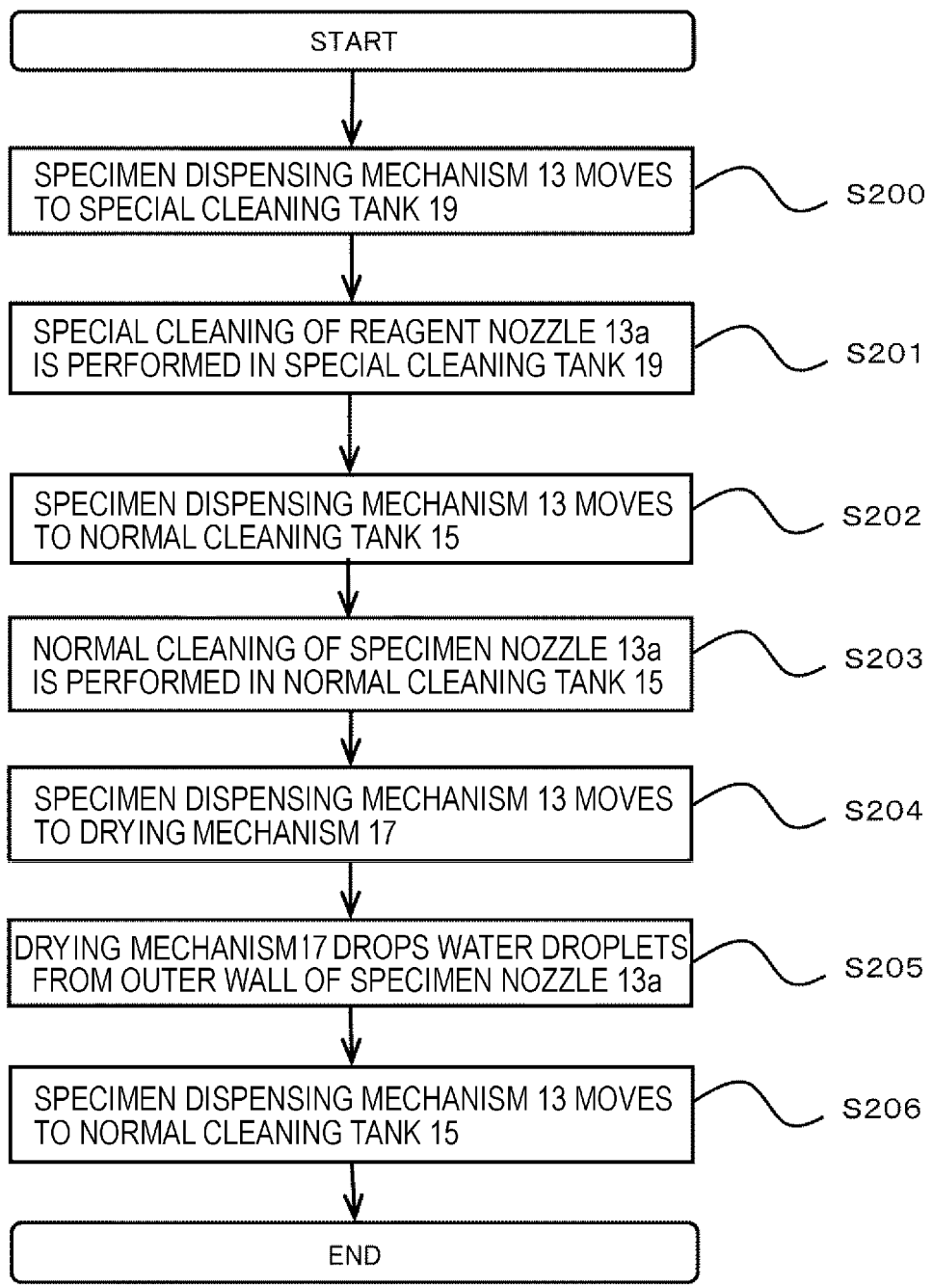
FIG. 5 is a flowchart of a special operation.

Next, a flow of a special operation performing a special cleaning will be described with reference to FIG. 5. Here, a dispensing operation of the specimen dispensing mechanism 13 of the two specimen dispensing mechanisms 13 and 14 will be described as an example.

The special operation in the present example is roughly divided into the special cleaning performed with a detergent, a normal cleaning performed thereafter, and drying performed thereafter.

Specifically, first, the specimen dispensing mechanism 13 moves from the normal cleaning tank 15 to the special cleaning tank 19 (step S200).

Next, the specimen dispensing nozzle 13a descends, and the specimen dispensing nozzle 13a is immersed in the detergent solution containing the detergent in the special cleaning tank 19.

In this state, the syringe connected to the specimen dispensing nozzle 13a operates to aspirate the detergent solution to perform the special cleaning, and then the inner wall and the outer wall of the specimen dispensing nozzle 13a are cleaned (step S201).

Then, the specimen dispensing nozzle 13a ascends, and the specimen dispensing mechanism 13 moves to the normal cleaning tank 15 (step S202).

Here, the specimen dispensing mechanism 13 causes the syringe to operate to discharge, from the specimen dispensing nozzle 13a, the detergent solution aspirated in the special cleaning tank 19 and the water from the tank (not shown), and then performs the internal cleaning on the specimen dispensing nozzle 13a (S203).

Then, the specimen dispensing mechanism 13 moves to the drying mechanism 17, and the specimen dispensing nozzle 13a descends (step S204).

Here, the drying mechanism 17 drops water droplets from the outer wall of the specimen dispensing nozzle 13a (step S205). Since the drying mechanism 17 blows the wind while the specimen dispensing nozzle 13a ascends, the water droplets can be evenly dropped in a height direction.

Then, the specimen dispensing mechanism 13 moves to the normal cleaning tank 15 (step S206).

Next, an actual operation method of the two specimen dispensing mechanisms 13 and 14 will be described. In the automatic analyzer according to the present example, the two specimen dispensing mechanisms 13 and 14 are operated at the same time in order to increase a processing capacity. An actual operation pattern is a combination of the above-mentioned dispensing operation and special operation, and as illustrated in FIG. 6, four operations are present. However, since the two specimen dispensing mechanisms 13 and 14 have the specimen aspiration position S1, the specimen discharge position C1, and the special cleaning tank 19 as common accessing locations, if the specimen dispensing mechanisms 13 and 14 are simply operated at the same time, the specimen dispensing mechanisms 13 and 14 may interfere with each other.

Therefore, with reference to FIGS. 7 to 9, a method for reducing a waiting time while preventing the mutual interference between the specimen dispensing mechanisms 13 and 14 will be described for each operation pattern. Here, the dispensing operation of the specimen will be described, but the same dispensing operation may be performed for the reagent. Timing charts illustrated in FIGS. 7 to 9 illustrate time zones, in a convex shape, assigned to the operations of the specimen dispensing mechanisms 13 and 14, the normal cleaning in the normal cleaning tanks 15 and 16, the special cleaning in the special cleaning tank 19, and the drying performed by the drying mechanism when a series of the dispensing operations illustrated in FIG. 4 is one cycle.

Figure 7:
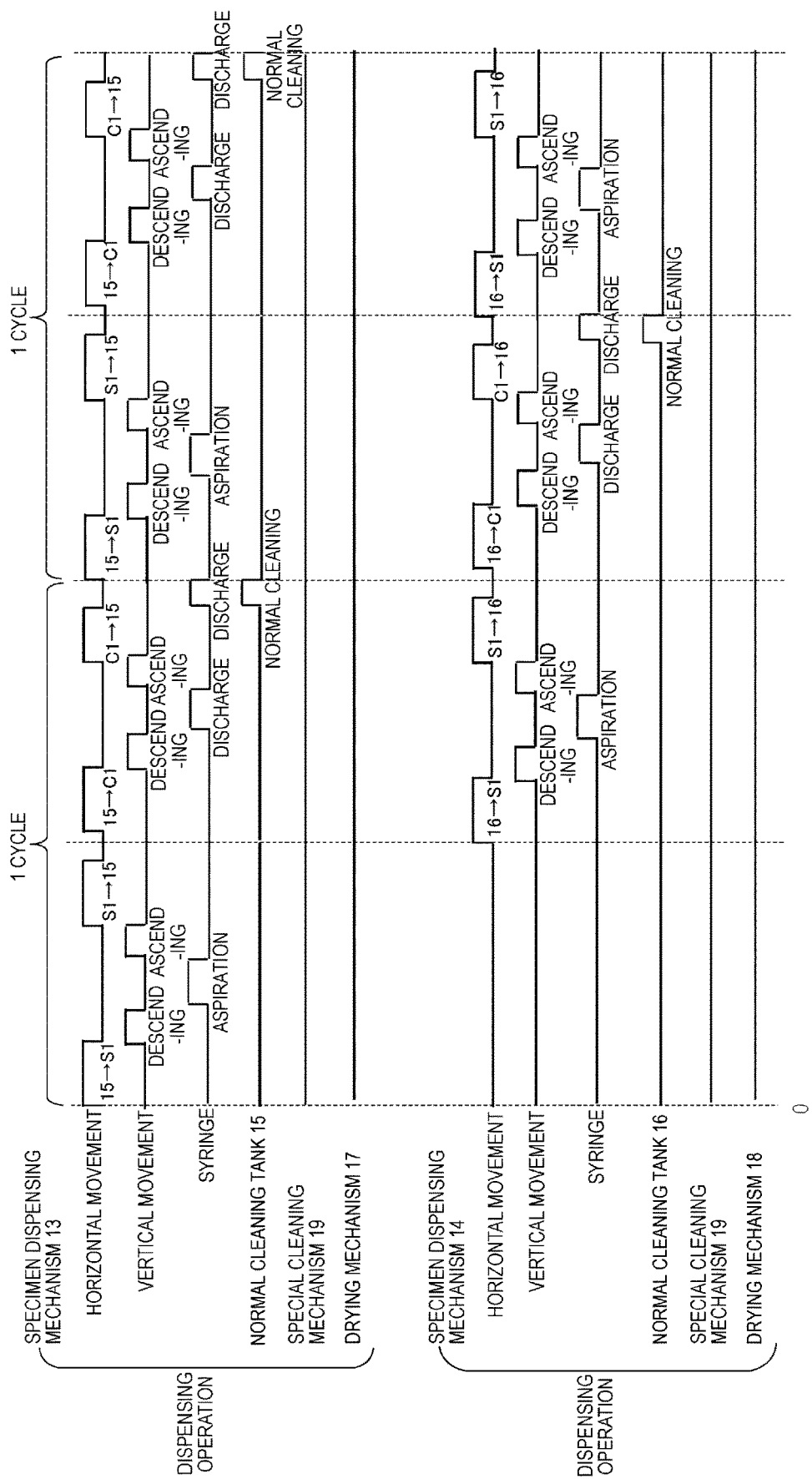
FIG. 7 is a timing chart in a case where both specimen dispensing mechanisms perform a dispensing operation.

FIG. 7 is the timing chart illustrating the operations or the like of the specimen dispensing nozzles 13a and 14a when the special cleaning is not included in the test item set for the specimen as a required item. In this case, FIG. 7 corresponds to a pattern in which the specimen dispensing mechanisms 13 and 14 both perform the dispensing operation.

Figure 4:
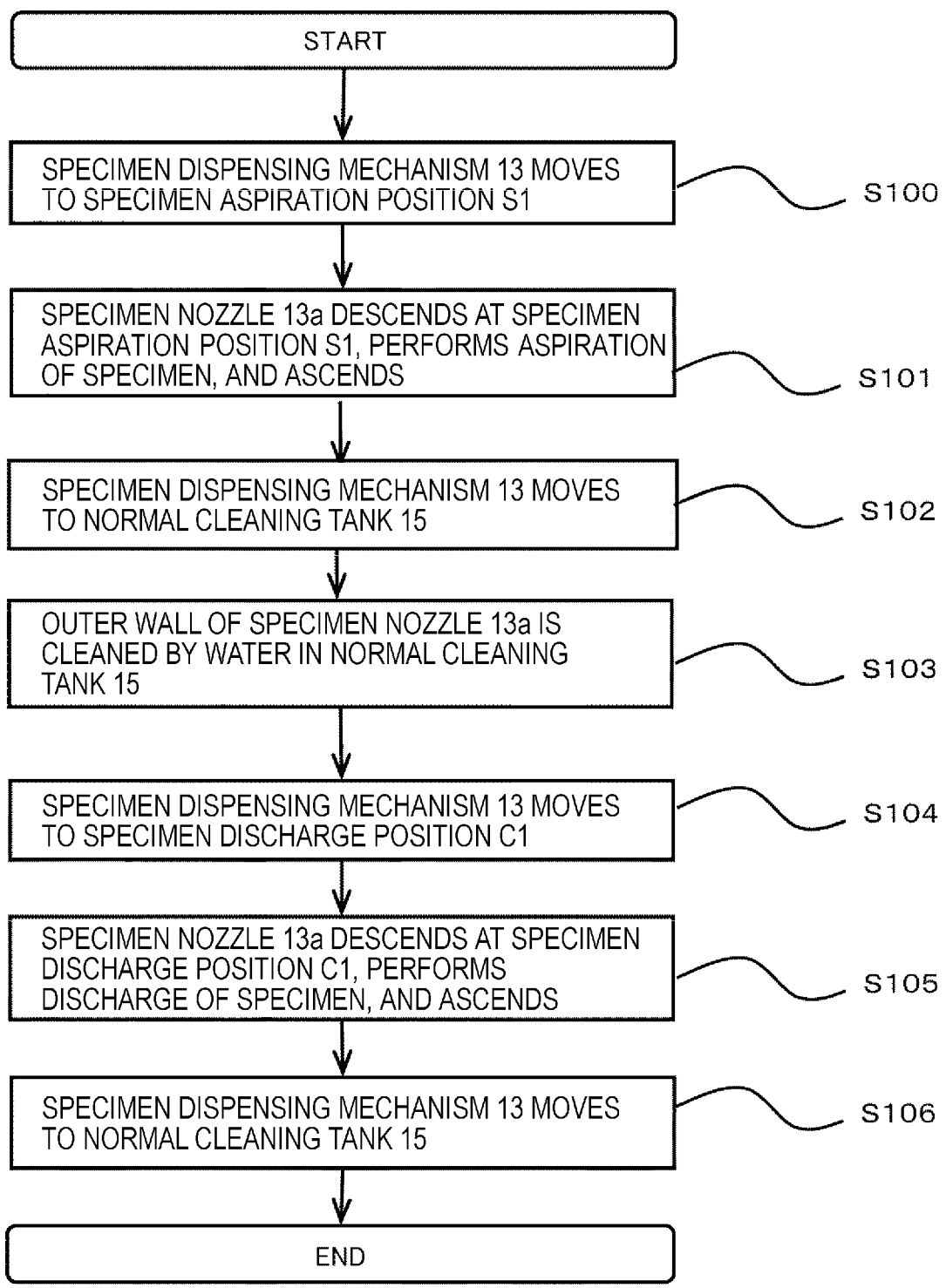
FIG. 4 is a flowchart of a dispensing operation.

Since the specimen dispensing mechanisms 13 and 14 both perform the dispensing operation illustrated in FIG. 4, if the two specimen dispensing mechanisms 13 and 14 start the dispensing operation at the same time, the specimen dispensing mechanisms 13 and 14 may interfere with each other at the specimen aspiration position S1 and the specimen discharge position C1. Therefore, by shifting a start point (phase) of the dispensing operation of one specimen dispensing mechanism by half a cycle from the other specimen dispensing mechanism, the specimen dispensing mechanisms 13 and 14 can be prevented from interfering with each other. As a result, occurrence of the waiting time during the dispensing operation is prevented, and a speed-up of processing of the automatic analyzer can be achieved. The normal cleaning tanks dedicated to the specimen dispensing mechanisms 13 and 14 respectively are each provided at a position where only one of the plurality of specimen dispensing mechanisms 13 and 14 accesses, and when one specimen dispensing mechanism accesses the normal cleaning tank, the one specimen dispensing mechanism does not interfere with the other specimen dispensing mechanism.

Figure 8:
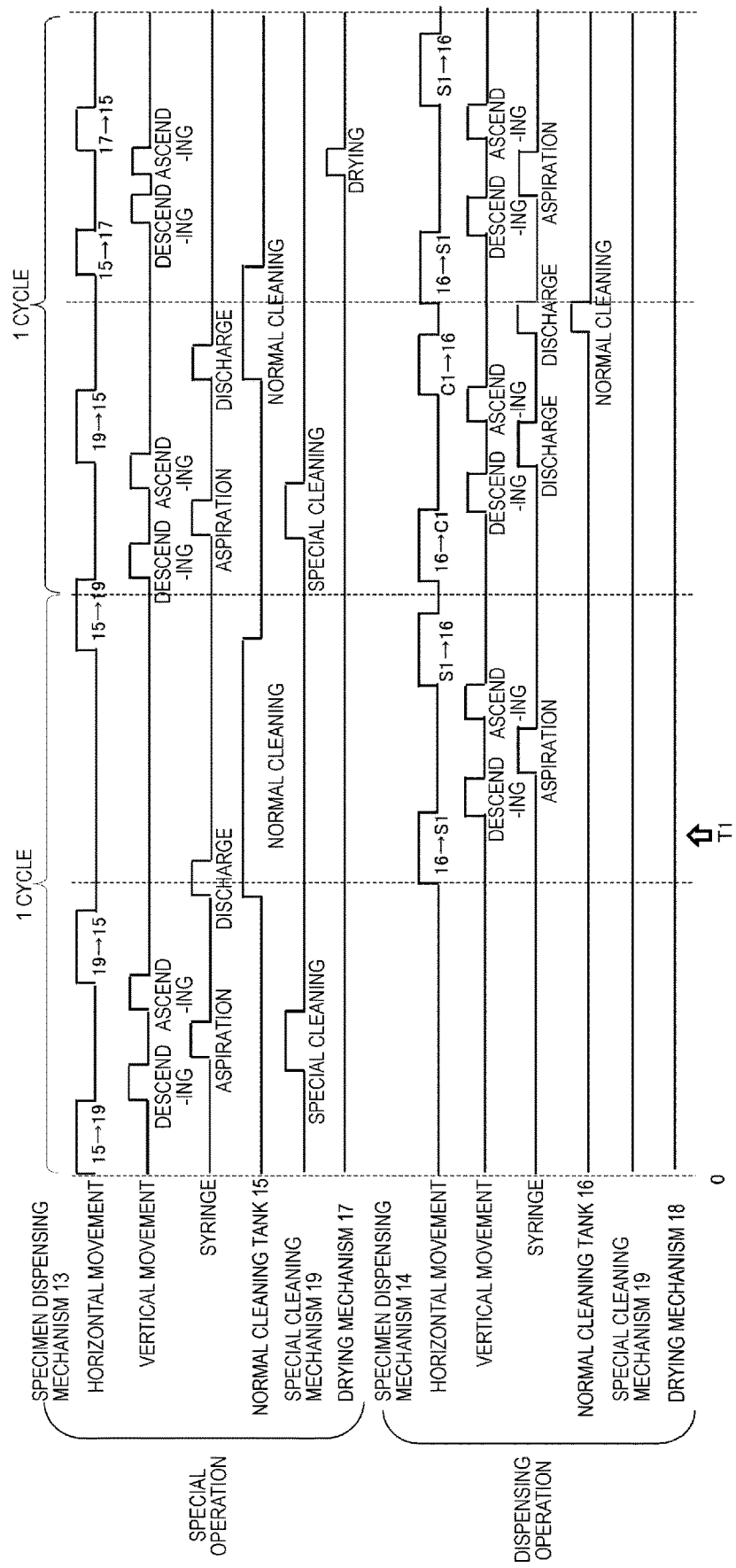
FIG. 8 is a timing chart in a case where one specimen dispensing mechanism performs a special operation and the other specimen dispensing mechanism performs a dispensing operation.
Figure 9:
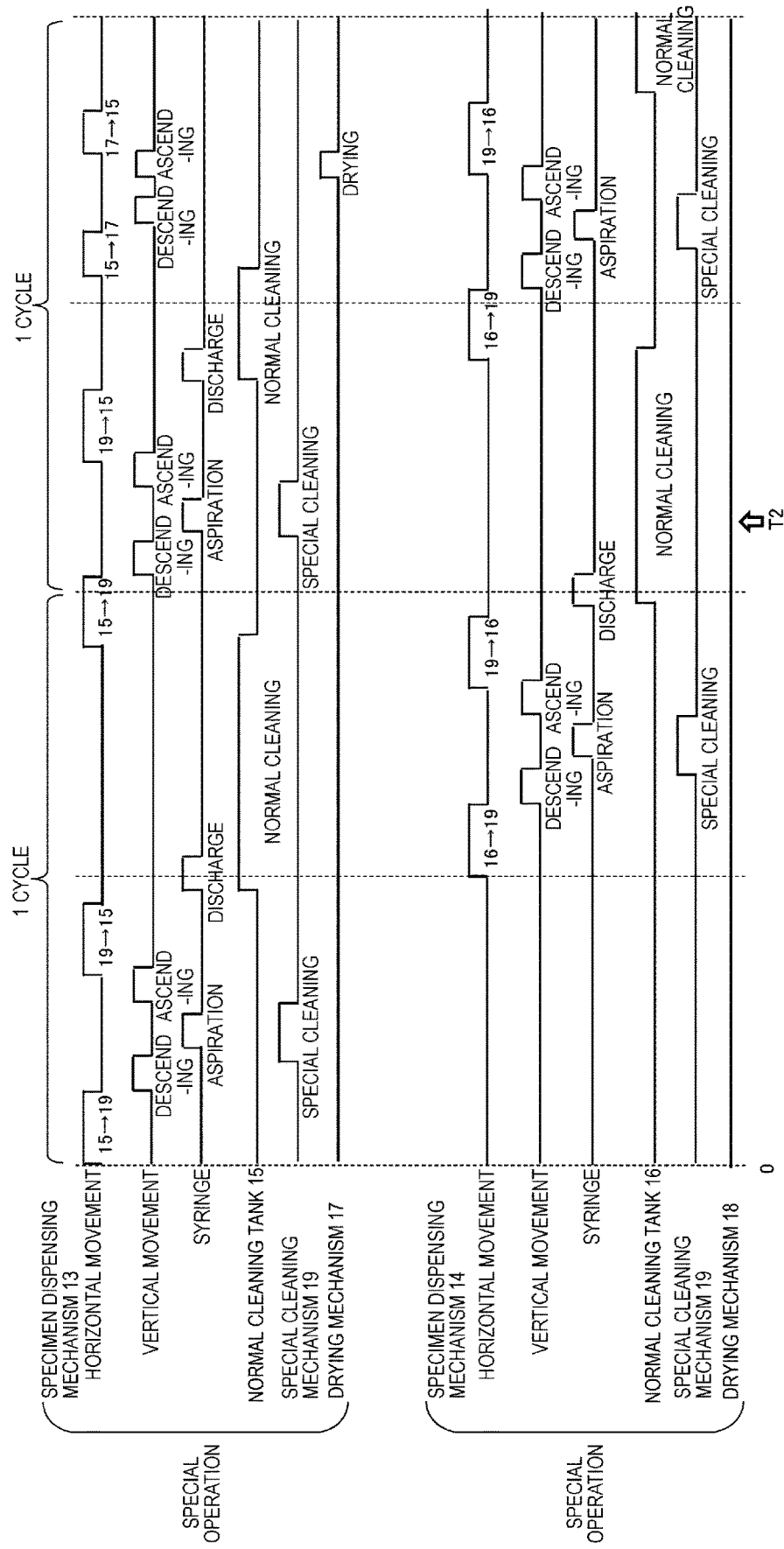
FIG. 9 is a timing chart in a case where both specimen dispensing mechanisms perform a special operation.

FIG. 8 is the timing chart illustrating the operations or the like of the specimen dispensing mechanisms 13 and 14 when the test item set for the specimen includes one special cleaning as a required item. Here, a pattern in which the specimen dispensing mechanism 13 performs the special operation and the specimen dispensing mechanism 14 performs the dispensing operation will be described as an example. Here, since the same operation is performed in a pattern in which the specimen dispensing mechanism 13 performs the dispensing operation and the specimen dispensing mechanism 14 performs the special operation, a description is omitted.

Figure 10:
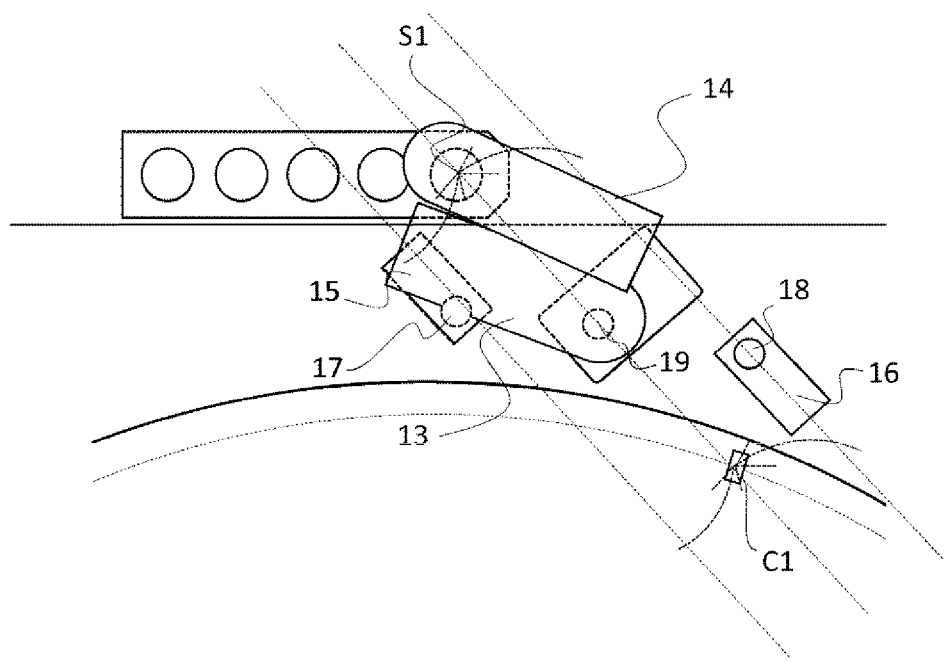
FIG. 10 is a side view illustrating a state where the specimen dispensing mechanisms interfere with each other.

First, as a premise of the present example, the one specimen dispensing mechanism when the one specimen dispensing mechanism accesses the special cleaning tank 19 during the special operation, and a trajectory where the other specimen dispensing mechanism reciprocates between the aspiration position S1 and the specimen discharge position C1 during the dispensing operation have an interference region. Therefore, as illustrated in FIG. 10, when the specimen dispensing mechanism 13 accesses the special cleaning tank 19, if the specimen dispensing mechanism 14 tries to move to the specimen aspiration position S1, the specimen dispensing mechanisms 13 and 14 interfere with each other.

Figure 11:
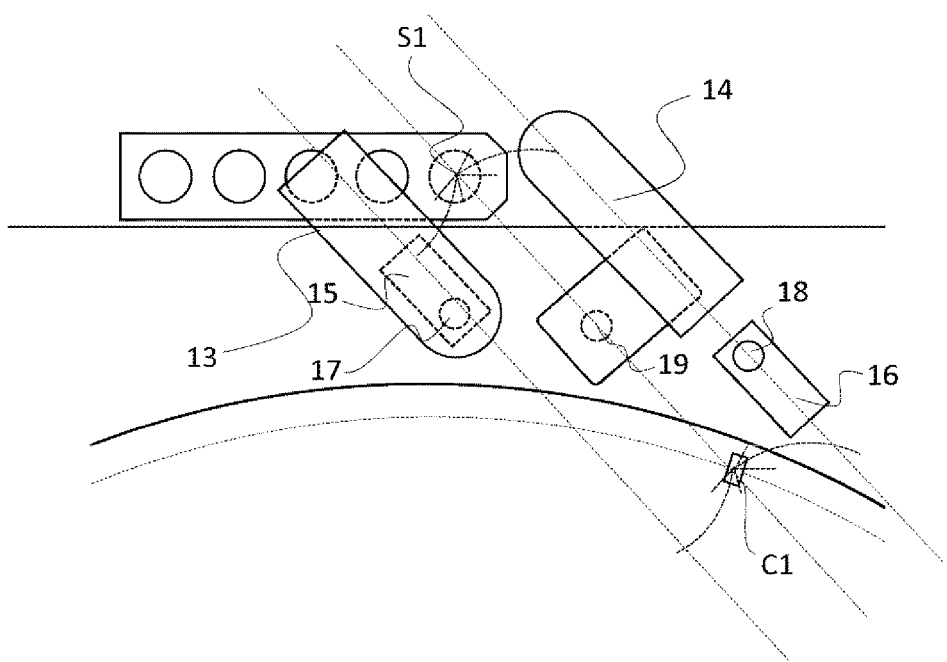
FIG. 11 is a plan view illustrating a positional relationship of the specimen dispensing mechanisms at a timing indicated by T1 in FIG. 8.

Therefore, in the present example, in a case where the specimen dispensing mechanism 13 performs the special operation and the other specimen dispensing mechanism 14 performs the dispensing operation, the specimen dispensing mechanism 13 accesses a retreat position away from the special cleaning tank 19 when the other specimen dispensing mechanism 14 moves in the interference region. FIG. 11 is a plan view illustrating a positional relationship of the specimen dispensing mechanisms 13 and 14 at a timing indicated by T1 in FIG. 8. As illustrated in FIG. 8, when the specimen dispensing mechanism 14 during the dispensing operation moves in the interference region, the controller 26 causes the specimen dispensing mechanism 13 during the special operation to access the position of the normal cleaning tank 15, so that the specimen dispensing mechanisms 13 and 14 can be prevented from interfering with each other.

Accordingly, the specimen dispensing mechanism 13 must access the normal cleaning tank 15 during the special operation, and in the one cycle corresponding to one dispensing operation of the specimen dispensing mechanism 14, sufficient special cleaning cannot be performed, and carryover of the previous specimen may occur. Therefore, in the present example, the special cleaning is divided into first special cleaning and subsequent second special cleaning, and the first special cleaning is carried out in a first cycle and the second special cleaning is carried out in a second cycle. Specifically, first, during the dispensing operation of the specimen dispensing mechanism 14 in the first cycle, the specimen dispensing mechanism 13 performs the first special cleaning, and the controller 26 causes the specimen dispensing mechanism 13 to access the retreat position when the specimen dispensing mechanism 14 moves in the interference region. During the dispensing operation of the specimen dispensing mechanism 14 in the second cycle, the specimen dispensing mechanism 13 performs the second special cleaning, and the controller 26 causes the specimen dispensing mechanism 13 to access the retreat position when the specimen dispensing mechanism 14 moves in the interference region.

In the special operation of the present example, after the special cleaning is performed, the drying mechanism 17 is accessed to dry the specimen dispensing mechanism 13. Accordingly, with consideration of performing the drying after the special cleaning, in the present example, a time of the second special cleaning is shorter than that of the first special cleaning, and both the second special cleaning and the drying are performed in the second cycle. Specifically, during the dispensing operation of the specimen dispensing mechanism 14 in the second cycle, after the specimen dispensing mechanism 13 performs the second special cleaning, the specimen dispensing mechanism 13 accesses the retreat position when the specimen dispensing mechanism 14 moves in the interference region, and then the specimen dispensing mechanism 13 accesses the drying mechanism to be dried.

In the present example, the special cleaning is divided into two times, but if the specimen pump 24 is small and a pressure is small, the special cleaning may be divided into three or more times. The retreat position is not limited to the position of the normal cleaning tank 15, and the specimen dispensing mechanism 13 when the specimen dispensing mechanism 13 accesses the retreat position and the trajectory where the specimen dispensing mechanism 14 reciprocates between the specimen aspiration position S1 and the specimen discharge position C1 during the dispensing operation may not have the interference region.

FIG. 9 is the timing chart illustrating the operations or the like of the specimen dispensing mechanisms 13 and 14 when the test item set for the specimen includes special cleaning performed twice as required items. In this case, FIG. 9 corresponds to a pattern in which the specimen dispensing mechanisms 13 and 14 both perform the special operation.

As illustrated in FIG. 9, the special operation of each specimen dispensing mechanism has two cycles of the dispensing operation. The first special cleaning and the normal cleaning are performed in the first cycle, and the second special cleaning, the normal cleaning, and the drying are performed in the second cycle.

Figure 12:
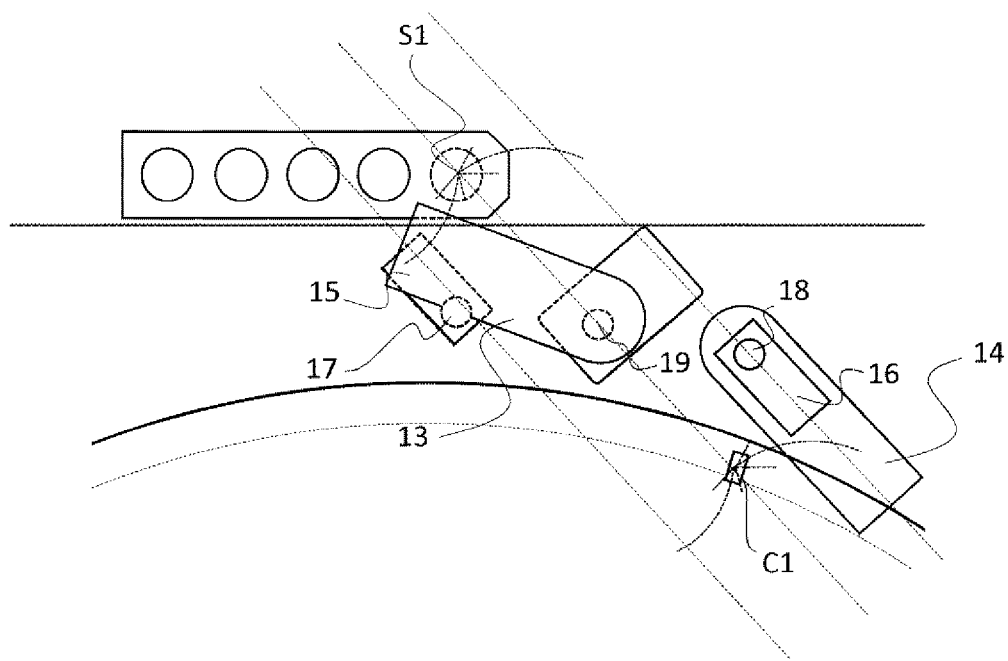
FIG. 12 is a plan view illustrating a positional relationship of the specimen dispensing mechanisms at a timing indicated by T2 in FIG. 9.

FIG. 12 is a plan view illustrating a positional relationship of the specimen dispensing mechanisms 13 and 14 at a timing indicated by T2 in FIG. 9. As illustrated in FIG. 12, when the special cleaning of the specimen dispensing mechanism 13 is performed in the special cleaning tank 19, the controller 26 causes the specimen dispensing mechanism 14 to access the retreat position away from the special cleaning tank 19, specifically, the normal cleaning tank 16. By operating in this way, the specimen dispensing mechanisms 13 and 14 can be prevented from interfering with each other.

According to the present example described above, since only one special cleaning tank larger than the normal cleaning tank or the drying mechanism is required, the entire analyzer can be miniaturized and the manufacturing cost can be reduced. Even though the special cleaning tank is shared, the waiting time for avoiding the interference of the mechanisms can be prevented from being generated in each specimen dispensing mechanism, and a decrease in the processing capacity can be prevented. Therefore, the automatic analyzer that copes with micro-quantity of the specimen and high sensitivity of the analysis, may have a mechanism configuration with a high density, and has a high processing capacity can be achieved.

In the present example, since the drying mechanisms dedicated for the specimen dispensing mechanisms respectively are provided, an operation for avoiding the interference during the drying becomes unnecessary, and an increase in the waiting time can be prevented.

Example 2

Figure 13:
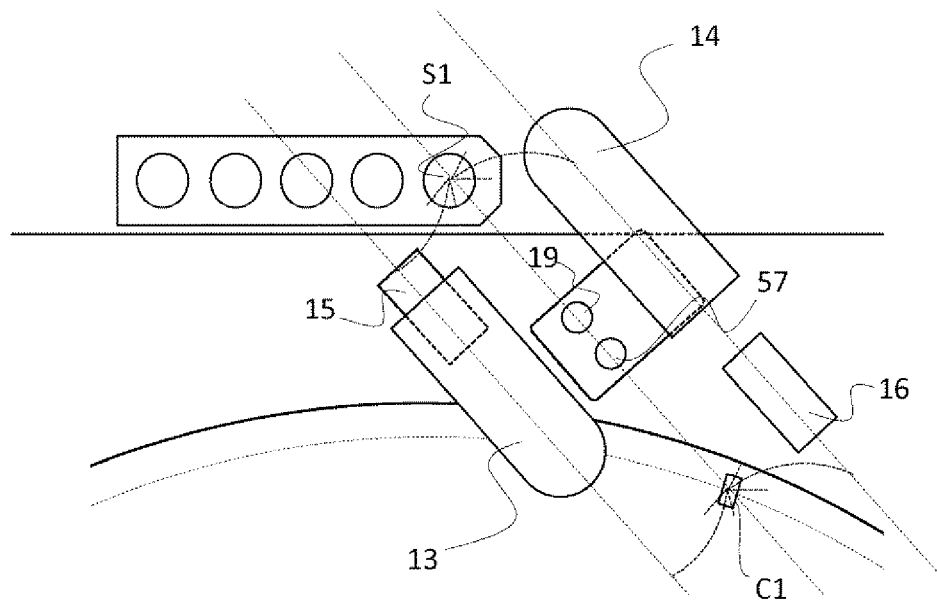
FIG. 13 is a plan view illustrating a positional relationship of specimen dispensing mechanisms according to Example 2.

FIG. 13 is a plan view illustrating a positional relationship of the specimen dispensing mechanisms 13 and 14 in the present example. As illustrated in FIG. 13, the present example is an automatic analyzer in which a drying mechanism 57 shared by the specimen dispensing mechanisms 13 and 14 is disposed at a position where the specimen dispensing mechanisms 13 and 14 both access. Since the automatic analyzer of the present example requires not only one special cleaning tank but also one drying mechanism, the entire analyzer can be further miniaturized and the manufacturing cost can be further reduced.

Example 3

Figure 14:
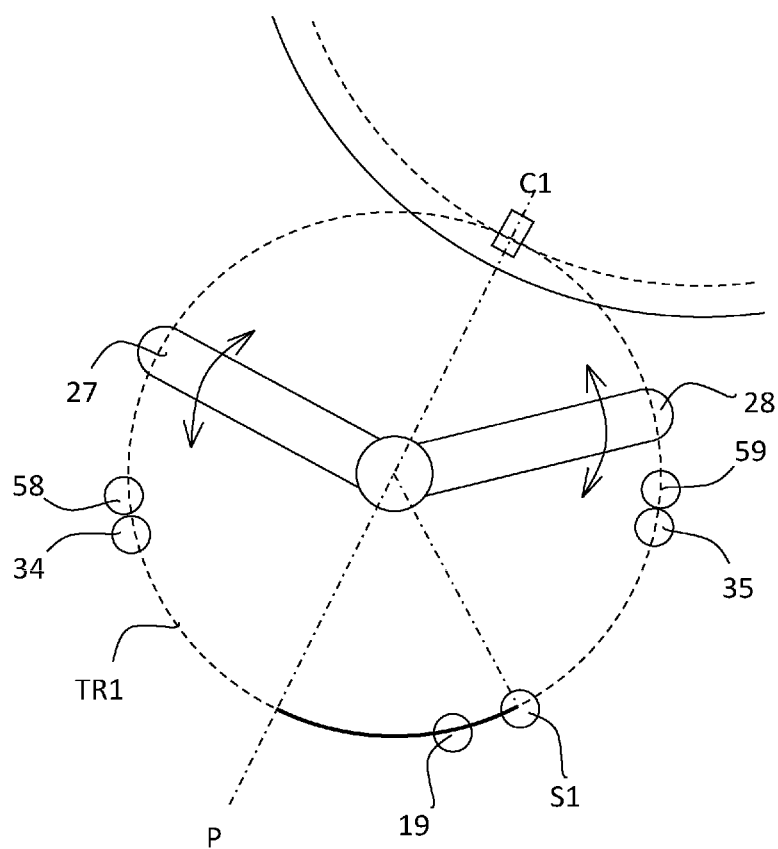
FIG. 14 is a plan view illustrating a positional relationship of specimen dispensing mechanisms according to Example 3.

FIG. 14 is a plan view illustrating a positional relationship of specimen dispensing mechanisms 27 and 28 in the present example. In Examples 1 and 2 described above, each sample dispensing mechanism is configured to linearly move between the specimen aspiration position S1 and the specimen discharge position C1, and in the present example, each sample dispensing mechanism is configured to rotationally move between the specimen aspiration position S1 and the specimen discharge position C1.

As illustrated in FIG. 14, the specimen dispensing mechanisms 27 and 28 of the present example each include a mechanism that can coaxially rotate and move up and down, and can access the specimen discharge position C1 and the specimen aspiration position S1 provided in common for the two specimen dispensing mechanisms. Between the specimen discharge position C1 and the specimen aspiration position S1, a dedicated normal cleaning tank 34 and a dedicated drying mechanism 58 are disposed at a position where only the specimen dispensing mechanism 27 accesses, and a dedicated normal cleaning tank 35 and a dedicated drying mechanism 59 are disposed at a position where only the specimen dispensing mechanism 28 accesses.

An automatic analyzer according to the present example includes a special cleaning tank 19 that is commonly accessed by the specimen dispensing mechanisms 27 and 28, and the special cleaning tank 19 is on a circle trajectory TR1 same as that where the specimen discharge position C1, the specimen aspiration position S1, the normal cleaning tanks 34 and 35, and the drying mechanisms 58 and 59 are located. The position of the special cleaning tank 19 of the present example is between the normal cleaning tank 34 and the normal cleaning tank 35, and is on the trajectory TR1 on a specimen aspiration position S1 side.

It is desirable that the special cleaning tank 19 is disposed at a position such that movement distances of the specimen dispensing mechanisms 27 and 28 are not significantly biased. This is because if the movement distance of the one specimen dispensing mechanism becomes long, movement to the special cleaning tank 19 may not be within a desired time, and a wasteful cycle may be required as a whole. Therefore, in the present example, the special cleaning tank 19 is located on the trajectory TR1 (an arc illustrated by a solid line in FIG. 14), the trajectory TR1 connecting a point symmetry position (P) of the specimen discharge position C1 with respect to a rotation center of the specimen dispensing mechanisms 27 and 28 and the specimen aspiration position S1 and being a relatively shorter trajectory. Accordingly, the movement distances of the specimen dispensing mechanisms 27 and 28 between the specimen discharge position C1 and the special cleaning tank 19 become almost equal, and an advantage that operations of the specimen dispensing mechanisms 27 and 28 can be easily unified presents. Since a distance between the specimen aspiration position S1 and the special cleaning tank 19 is relatively short, even though the one specimen dispensing mechanism passes through the specimen aspiration position S1 and accesses the special cleaning tank 19, the one specimen dispensing mechanism can be quickly retreated to the dedicated normal cleaning tank and can be prevented from interfering with the other specimen dispensing mechanism. That is, according to the present example, a distance between the normal cleaning tank 34 and the special cleaning tank 19 is equal to a distance between the normal cleaning tank 35 and the special cleaning tank 19, and a waiting time for avoiding the interference of the specimen dispensing mechanism is prevented, so that a cleaning process can be performed efficiently.

Here, a case where the specimen dispensing mechanisms 27 and 28 rotate coaxially will be described as an example, but even though centers of rotation are not the same, the specimen can be discharged to a reaction vessel disposed at the specimen discharge position C1, or the special cleaning tank 19 can be used. Therefore, a form in which rotation center axes of the specimen dispensing mechanisms 27 and 28 are not exactly the same and are slightly deviated is also included in the term "coaxially" of the present specification.

Figure 15:
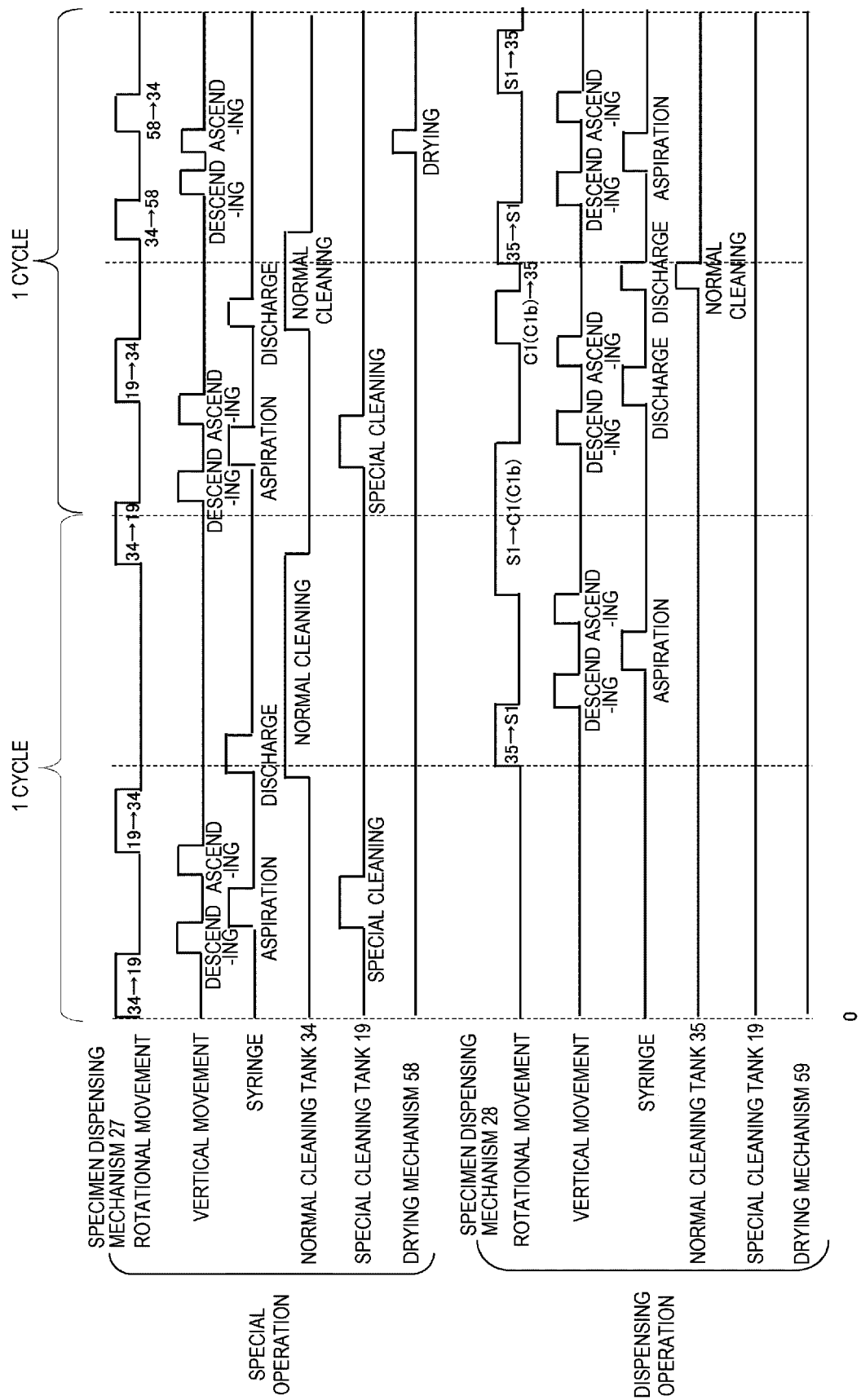
FIG. 15 is a timing chart in a case where one specimen dispensing mechanism performs a special operation and the other specimen dispensing mechanism performs a dispensing operation in Example 3.

FIG. 15 is a timing chart illustrating operations or the like of the specimen dispensing mechanisms 27 and 28 of the present example when the test item set for the specimen includes the special cleaning performed once as a required item. Here, a pattern in which the specimen dispensing mechanism 27 performs the special operation and the specimen dispensing mechanism 28 performs the dispensing operation will be described as an example. Similar to Example 1, two cycles are used for the special operation, whereas dispensing is performed once per cycle for the dispensing operation. For example, as illustrated in FIG. 15, after the specimen dispensing mechanism 27 performing the special operation moves from the normal cleaning tank 34 to the special cleaning mechanism 19 to be performed with the special cleaning, if the specimen dispensing mechanism 27 moves the normal cleaning tank 34 to the special cleaning mechanism 19 to be performed with the normal cleaning and moves from the normal cleaning tank 34 to the special cleaning mechanism 19 to be performed with the special cleaning again, the specimen dispensing mechanism 27 moves from the special cleaning mechanism 19 to the normal cleaning tank 34 to be performed with the normal cleaning, and moves from the normal cleaning tank 34 to the drying mechanism 58 to be dried, and then moves from the drying mechanism 58 to the normal cleaning tank 34.

Figure 16:
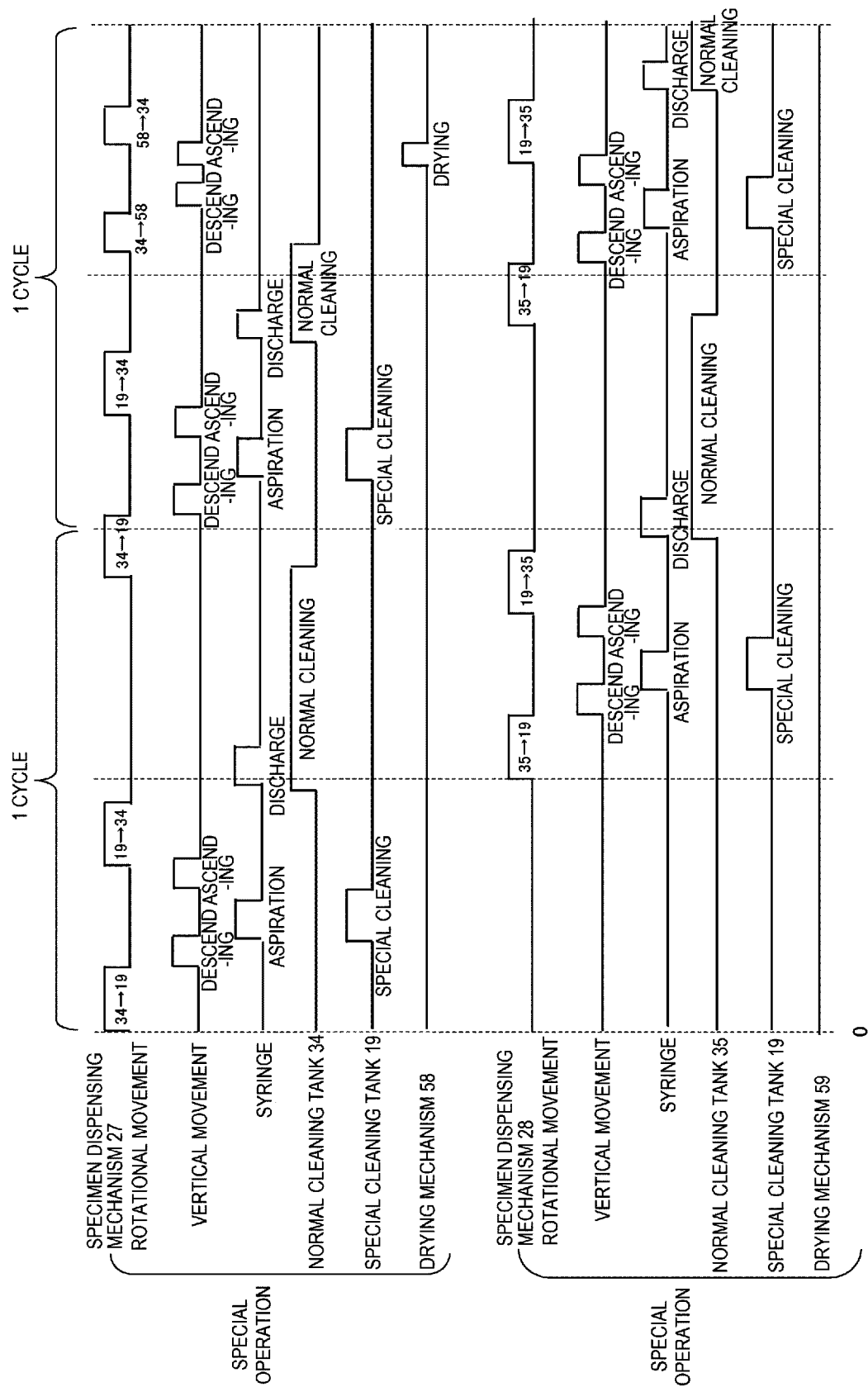
FIG. 16 is a timing chart in a case where both specimen dispensing mechanisms perform a special operation in Example 3.

FIG. 16 is the timing chart illustrating operations or the like of the specimen dispensing mechanisms 27 and 28 of the present example when the test item set for the specimen includes two items requiring the special cleaning. For example, when the specimen dispensing mechanism 28 is in the special cleaning tank 19, the specimen dispensing mechanism 27 is located at a retreat position of the dedicated normal cleaning tank 34 or the like, and when the specimen dispensing mechanism 28 moves to a retreat position of the dedicated normal cleaning tank 35 or the like, the specimen dispensing mechanism 27 moves to the normal cleaning tank 19. Therefore, the specimen dispensing mechanisms can prevent physical interference with each other while preventing an unnecessary waiting time.

Figure 17:
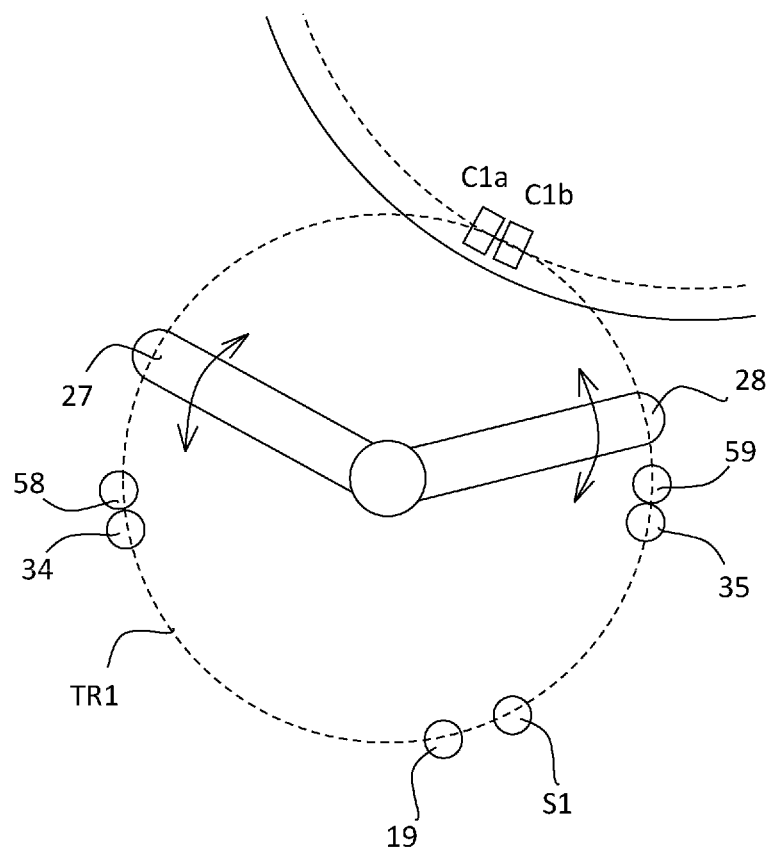
FIG. 17 is a plan view illustrating a positional relationship of specimen dispensing mechanisms according to a modification of Example 3.

FIG. 17 is a plan view illustrating a positional relationship of specimen dispensing mechanisms 27 and 28 according to a modification of Example 3. As illustrated in FIG. 17, the modification has the same position such as the special cleaning tank 19 as in Example 3, but differs in that the modification has a plurality of specimen discharge positions C1a and C1b. A position of a point symmetry P described above varies depending on which of the specimen discharge positions C1a and C1b is used as a reference, and thus a point on the trajectory TR1 located between a point symmetry with respect to the specimen discharge position C1a and a point symmetry with respect to the specimen discharge position C1b is adopted as the convenient point symmetry P in this case. However, since the specimen discharge positions are usually close to each other, the same effect can be exerted regardless of which position is used as a reference.

Example 4

Figure 18:
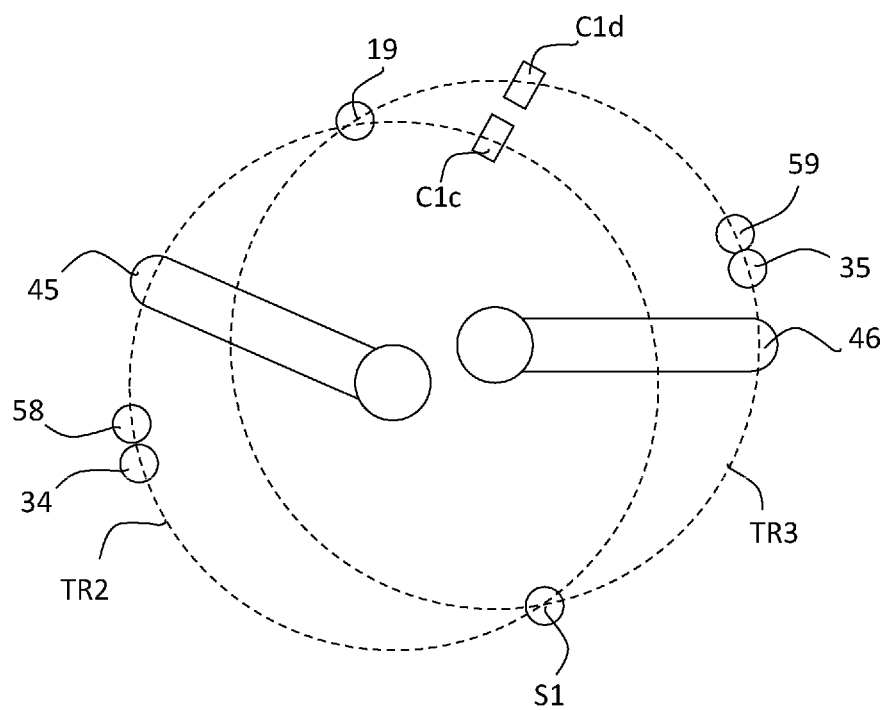
FIG. 18 is a plan view illustrating a positional relationship of specimen dispensing mechanisms according to Example 4.

FIG. 18 is a plan view illustrating a positional relationship of specimen dispensing mechanisms 45 and 46 in the present example. As illustrated in FIG. 18, the specimen dispensing mechanisms 45 and 46 of the present example respectively include mechanisms rotationally moving around different axes, and pass through different trajectories TR2 and TR3. The common special cleaning tank 19 and the common specimen aspiration position S1 are located at intersections of the trajectories, the dedicated normal cleaning tank 34 and the dedicated drying mechanism 58 are located on the trajectory TR2 in addition to a specimen discharge position C1c, and the dedicated normal cleaning tank 35 and the dedicated drying mechanism 59 are located on the trajectory TR3 in addition to a specimen discharge position C1d.

Figure 19:
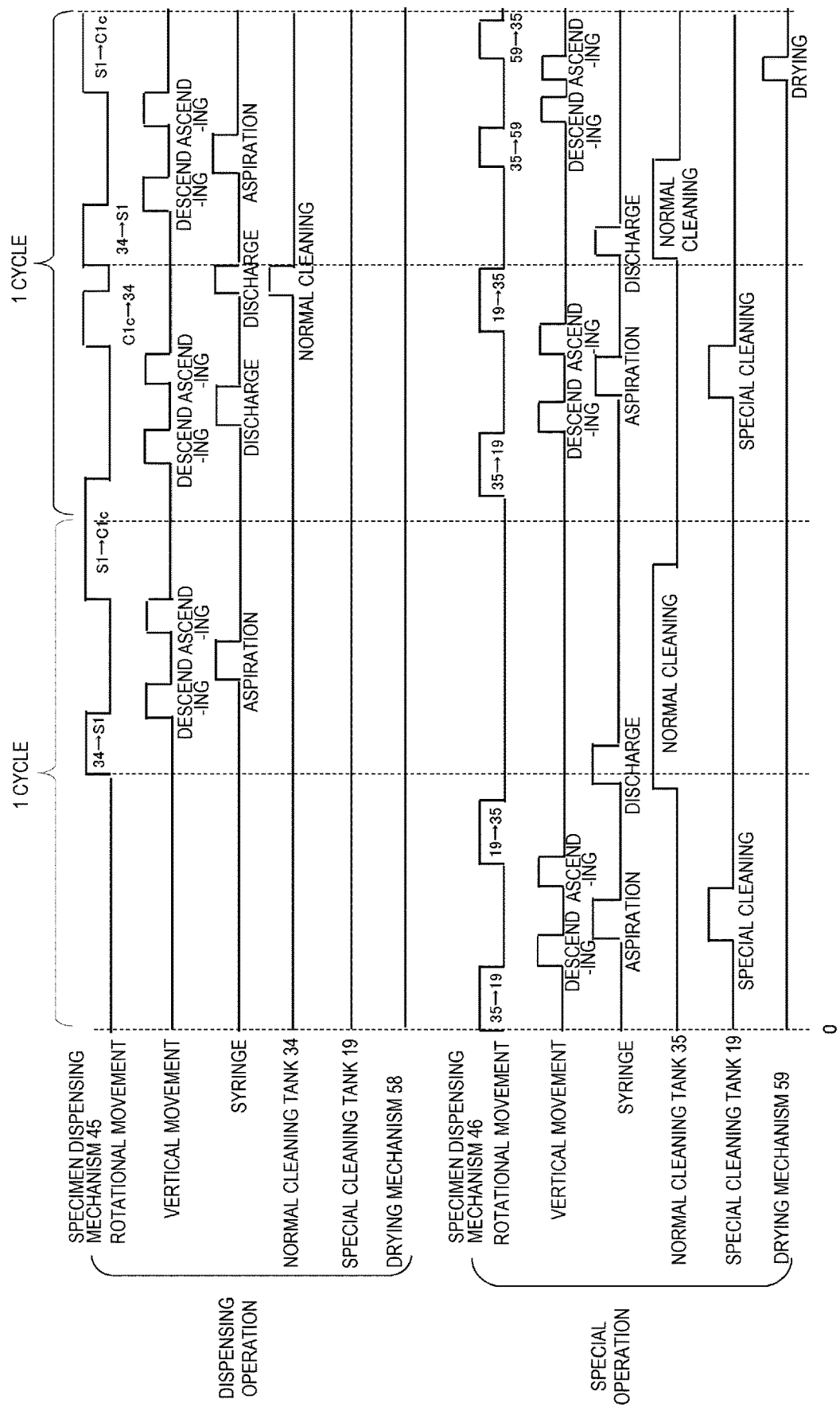
FIG. 19 is a timing chart in a case where one specimen dispensing mechanism performs a dispensing operation and the other specimen dispensing mechanism performs a special operation in Example 4.

FIG. 19 is the timing chart illustrating operations or the like of the specimen dispensing mechanisms 45 and 46 of the present example when the test item set for the specimen includes special cleaning performed once as a required item. Here, a pattern in which the specimen dispensing mechanism 45 performs the dispensing operation and the specimen dispensing mechanism 46 performs the special operation will be described as an example.

For example, when the specimen dispensing mechanism 46 is in the special cleaning tank 19, the specimen dispensing mechanism 45 is located at the specimen discharge position C1c, and when the specimen dispensing mechanism 46 ends the special cleaning and starts to move to the dedicated normal cleaning tank 35, the specimen dispensing mechanism 45 passes through the special cleaning tank 19 and moves to the dedicated normal cleaning tank 34. Therefore, the specimen dispensing mechanisms can prevent the physical interference with each other while preventing the unnecessary waiting time.

Figure 20:
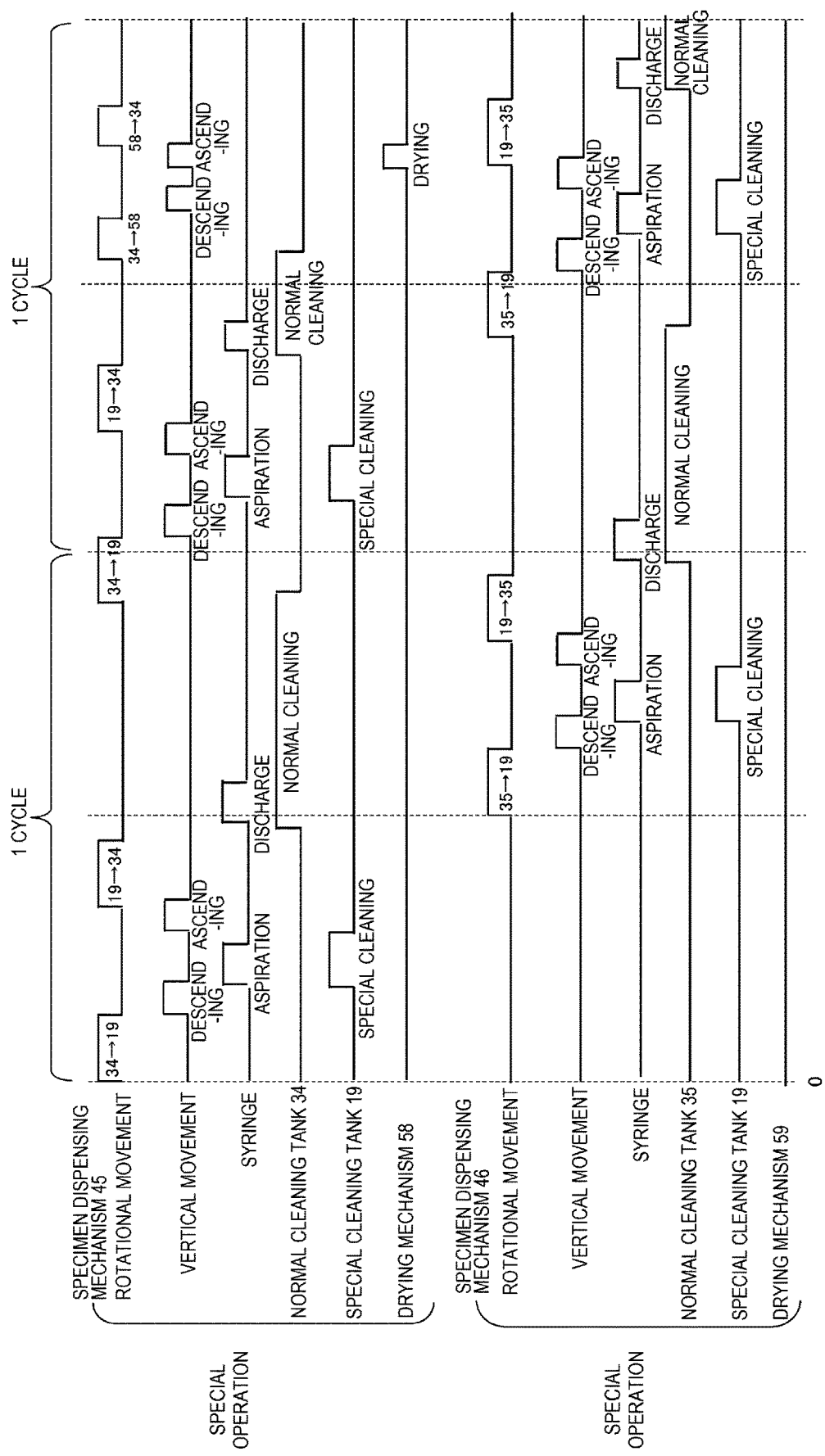
FIG. 20 is a timing chart in a case where both specimen dispensing mechanisms perform a special operation in Example 4.

FIG. 20 is the timing chart illustrating operations or the like of the specimen dispensing mechanisms 45 and 46 of the present example when the test item set for the specimen includes the special cleaning performed twice as required items. For example, the specimen dispensing mechanism 45 located at a retreat position of the dedicated normal cleaning tank 34 or the like when the specimen dispensing mechanism 46 is in the special cleaning tank 19, and when the specimen dispensing mechanism 46 moves to a retreat position of the dedicated normal cleaning tank 35 or the like, the specimen dispensing mechanism 45 moves to the special cleaning tank 19. Therefore, the specimen dispensing mechanisms can prevent physical interference with each other while preventing an unnecessary waiting time.

The invention is not limited to Examples 1 to 4 described above, and includes various modifications. For example, Examples 1 to 4 described above are described in detail for easy understanding of the invention, and are not necessarily limited to those including all the configurations described above. A part of a configuration of an example may be replaced with a configuration of another example, and the configuration of the example may also be added with the configuration of another example. A part of configurations of examples may be added to, deleted from, or replaced with another configuration.

What is claimed is:

1. An automatic analyzer that dispenses a specimen and a reagent individually into a reaction vessel and measures a liquid of the reaction, the automatic analyzer comprising:
   a plurality of dispensing mechanisms including a first dispensing mechanism and a second dispensing mechanism;
   a controller configured to control the plurality of dispensing mechanisms;
   a plurality of normal cleaning tanks, each of the plurality of normal cleaning tanks is respectively associated and dedicated to one and one only of the dispensing mechanisms, each normal cleaning tank being provided at respective different positions where only the associated dispensing mechanism access the associated normal cleaning tank, and each normal cleaning tank is configured to perform a normal cleaning operation of the associated dispensing mechanism having access; and
   a special cleaning tank shared by each of the dispensing mechanisms, which is provided at a position, which is immovable, where all of the plurality of dispensing mechanisms access, and is configured to perform a special cleaning operation of cleaning the dispensing mechanisms, which is different from the normal cleaning operation,
   wherein the special cleaning operation includes a first special cleaning operation and a subsequent second special cleaning operation, and
   wherein upon the first dispensing mechanism being at the special cleaning tank which is performing the first special cleaning operation and the second dispensing mechanism moves into an interference region with the first dispensing mechanism, the controller is configured to cause the first special cleaning operation of the first dispensing mechanism to stop and then move the first dispensing mechanism away from the special cleaning tank to a retreat position, and after the second dispensing mechanism moves out of the interference region, move the first dispensing mechanism to the special cleaning tank to resume the special cleaning operation as the subsequent special cleaning operation.

2. The automatic analyzer according to claim 1, wherein the controller is configured to:
   control each of the dispensing mechanisms according to a dispensing operation, in which each of the dispensing mechanisms reciprocates between an aspiration position of the specimen or the reagent and a discharge position of the specimen or the reagent and accesses the normal cleaning tank between the aspiration position of the specimen or the reagent and the discharge position of the specimen or reagent, and a special operation, in which the special cleaning operation is performed with respect to the dispensing mechanism in the special cleaning tank, and
   wherein only one dispensing mechanism accesses the special cleaning tank at a time during the special operation, and respective trajectories of the first dispensing mechanism and the second dispensing mechanism, among the dispensing mechanisms, reciprocating between the aspiration position and the discharge position during the dispensing operation have the interference region.

3. The automatic analyzer according to claim 2, wherein the controller is configured to:
   control the dispensing mechanisms, such that, when the second dispensing mechanism performs the dispensing operation of a first cycle, the first dispensing mechanism performs the first special cleaning operation, and while the second dispensing mechanism moves in the interference region, the first dispensing mechanism accesses the retreat position, and
   when the second dispensing mechanism performs the dispensing operation of a second cycle, the first dispensing mechanism performs the second special cleaning operation, and while the second dispensing mechanism moves in the interference region, the first dispensing mechanism accesses the retreat position.

4. The automatic analyzer according to claim 3, wherein the controller is configured to:
   in the special operation, such that after the special cleaning is performed, the first dispensing mechanism accesses a drying mechanism and drying of the first dispensing mechanism is performed, and
   when the second dispensing mechanism performs the dispensing operation of the second cycle, the first dispensing mechanism performs the second special cleaning, which is shorter than the first special cleaning, and accesses the retreat position while the second dispensing mechanism moves in the interference region, and thereafter, the first dispensing mechanism accesses the drying mechanism and drying of the first dispensing mechanism is performed.

5. The automatic analyzer according to claim 1,
wherein the controller is configured to:
control each of the dispensing mechanisms according to a dispensing operation, in which each of the dispensing mechanisms reciprocates between an aspiration position of the specimen or the reagent and a discharge position of the specimen or the reagent and accesses the normal cleaning tank between the aspiration position of the specimen or the reagent and the discharge position of the specimen or reagent, and a special operation, in which the special cleaning operation is performed with respect to the dispensing mechanism in the special cleaning tank,
wherein only one dispensing mechanism accesses the special cleaning tank at a time during the special operation, and respective trajectories of the first dispensing mechanism and the second dispensing mechanism, among the dispensing mechanisms, reciprocating between the aspiration position and the discharge position during the dispensing operation have the interference region, and
wherein the controller is configured to cause the second dispensing mechanism to access a retreat position away from the special cleaning tank, when the first dispensing mechanism performs the special cleaning operation.

6. The automatic analyzer according to claim 5,
wherein the retreat position is a position of the normal cleaning tank associated with the second dispensing mechanism.

7. The automatic analyzer according to claim 1,
wherein the plurality of dispensing mechanisms rotate coaxially and reciprocate between an aspiration position of the specimen or the reagent and a discharge position of the specimen or the reagent, and
wherein the special cleaning tank is located between the normal cleaning tanks.

8. The automatic analyzer according to claim 7,
wherein the special cleaning tank is located on a trajectory that connects a point symmetry position of the discharge position with respect to a rotation center and the aspiration position.

9. The automatic analyzer according to claim 1,
wherein the plurality of dispensing mechanisms rotate around different axes and reciprocate between an aspiration position of the specimen or the reagent and a discharge position of the specimen or the reagent in different trajectories, and
wherein the special cleaning tank is located at an intersection of the trajectories.

* * * * *